May 13, 1969  JAMES E. WEBB  3,443,384
ADMINISTRATOR OF THE NATIONAL AERONAUTICS
AND SPACE ADMINISTRATION
SWIRLING FLOW NOZZLE

Filed May 17, 1967  Sheet 1 of 2

FRANK X. MCKEVITT
INVENTOR.

BY *G. H. McCoy*
*Howard B. Scheckman*
ATTORNEYS

Fig. 2
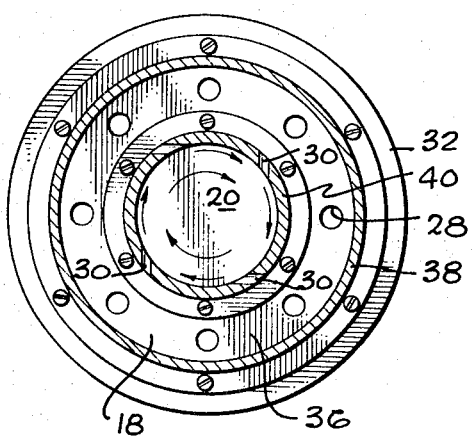
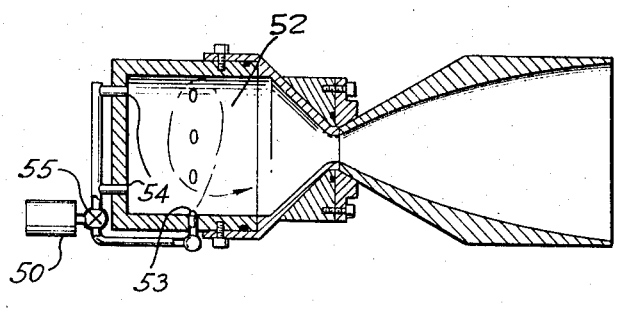
Fig. 3
FRANK X. MCKEVITT
INVENTOR.
BY
Howard B. Scheckman
ATTORNEYS 3,443,384
SWIRLING FLOW NOZZLE
James E. Webb, Administrator of the National Aeronautics and Space Administration with respect to an invention by Frank X. McKevitt, Palos Verdes Peninsula, Calif.
Filed May 17, 1967, Ser. No. 640,787
Int. Cl. F02k 1/02, 9/00; B05b 3/00
U.S. Cl. 60—263    4 Claims

ABSTRACT OF THE DISCLOSURE

This disclosure relates generally to rocket engines. It teaches a method and construction for increasing the efficiency of a rocket engine by matching its exhaust gas pressure with changing ambient pressure. Essentially, a gas is introduced tangentially into the engine so as to form a vortex within the nozzle. The size of the vortex can be used to vary the effective throat area of the nozzle. The size of the vortex can be changed by varying the relative amounts of axial and/or tangential flow of gases to the nozzle.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates generally to rocket engines. More particularly, the invention relates to a novel swirling flow method of increasing rocket engine performance as well as to a novel swirling flow exhaust nozzle for rocket engines.

It is well recognized that one of the parameters which determine the efficiency of a rocket engine is the relationship between the pressure of the rocket exhaust gases and the surrounding ambient pressure. More specifically, it is known that maximum rocket engine efficiency, i.e. maximum thrust coefficient, is obtained by matching the exhaust gas pressure with the ambient pressure. Prior techniques for achieving this pressure match have involved utilization of an appropriate nozzle of fixed configuration for expanding the exhaust gases to a pressure approximating ambient pressure. These existing techniques, however, are not satisfactory were a variation in ambient pressure or rocket nozzle total pressure (throttling) is encountered.

It is a general object of the present invention to provide a novel swirling flow method of and a novel swirling flow rocket engine exhaust nozzle for expanding rocket engine exhaust gases to a pressure approximating ambient pressure and thereby maximizing rocket engine efficiency.

A more specific object of the invention is to provide a swirling flow method and rocket engine exhaust nozzle of the character described wherein expansion of the rocket exhaust gases to a pressure approximating ambient pressure is accomplished by utilization of a unique vortical exhaust flow technique for regulating the effective nozzle throat area and, thereby, the effective nozzle area ratio.

Since rocket engine thrust is dependent on the effective nozzle throat area, this matching must be done within the limits of the allowable thrust envelope. For exoatmospheric operation, the technique will provide increased effective area ratio and thrust coefficient as thrust is reduced.

Other objects, advantages, and features of the invention will become readily evident as the description proceeds.

With these and such other objects in view, the invention consists in the construction, arrangement, and combination of the various parts of the invention whereby the objects contemplated are attained, as hereinafter set forth, pointed out in the appended claims, and illustrated in the accompanying drawings in which:

FIGURE 2 is a section taken on line 2—2 in FIGURE 1; and

FIGURE 3 is a longitudinal section through a modified swirling flow nozzle assembly according to the invention.

Figure 1:
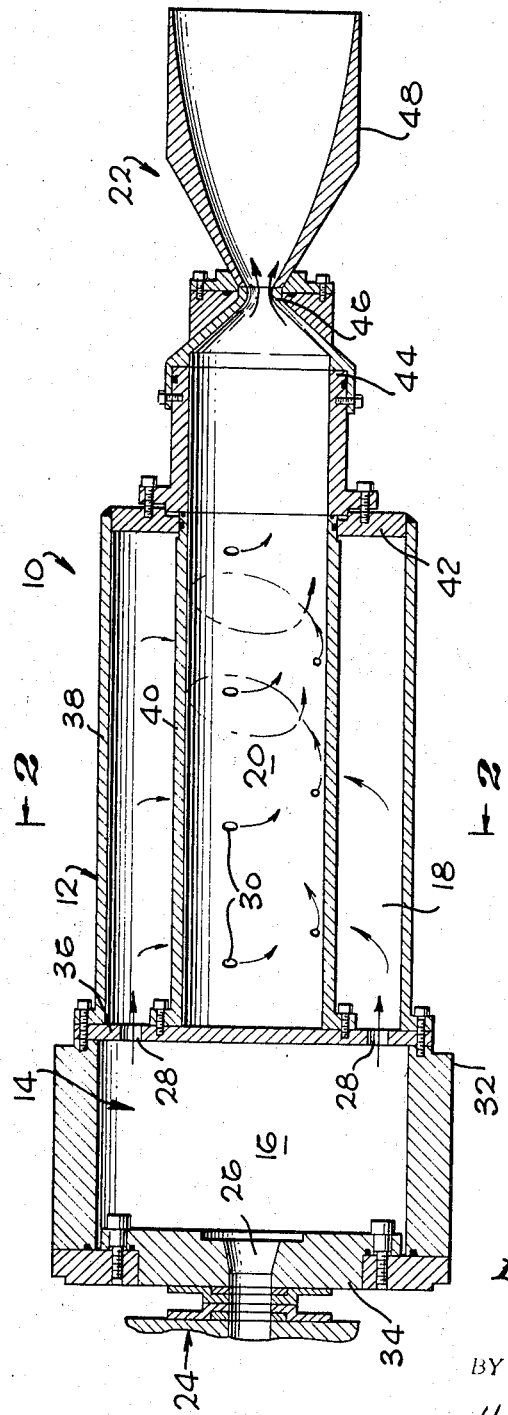
FIGURE 1 is a longitudinal section through a swirling flow nozzle assembly according to the invention.

The swirling flow nozzle assembly 10 of the invention which has been selected for illustration in FIGURES 1 and 2 of these drawings comprises a casing 12 defining an exhaust gas manifold 14 including an inlet plenum chamber 16 and an annular outlet plenum chamber 18, a swirl chamber 20 extending centrally through the outlet chamber, and an exhaust nozzle 22 proper. The exhaust gas inlet plenum chamber 16 receives gas under pressure from a rocket engine combustor 24 through an inlet 26 and communicates with the annular plenum chamber 18 via a number of ports 28. The outlet plenum chamber 18, in turn, communicates with the central swirl chamber 20 through a number of tangential injection ports 30 in the wall of the latter chamber. During operation of the nozzle assembly, high pressure exhaust gas from the rocket combustor 24 flows through the inlet and outlet plenum chambers 16, 18 and the tangential injection ports 30 into the swirl chamber 20. The tangential direction of these injection ports induces the entering exhaust gases to undergo vortical or swirling flow through the swirl chamber to the exhaust nozzle 22. As will appear presently, this swirling flow of the exhaust gas subjects the gas to a centrifugal force which confines the exhaust gas stream approaching the nozzle 22 to an annular flow path in such a way as to increase the effective area ratio of the nozzle. According to the present invention, this effective area ratio is regulated, by regulating the tangential velocity component of the exhaust gas entering the swirl chamber, to effect expansion of the exhaust gas to a pressure approximating ambient pressure. The efficiency or performance (i.e. thrust coefficient) of the rocket engine is thereby maximized.

Referring now in greater detail to the illustrated nozzle assembly 10, the nozzle casing 12 comprises a cylindrical wall or sleeve 32 to the ends of which are secured end walls 34 and 36. Sleeve 32 and its end walls 34, 36 define the inlet plenum chamber 16 of the exhaust gas manifold 14. End wall 34 is secured to the rocket combustor 24 and contains the exhaust gas inlet 26. End wall 36 contains the exhaust gas ports 28. Coaxially secured to the rear end wall 36 are a pair of concentric cylindrical walls or sleeves 38 and 40 which are radially spaced to define therebetween the outlet plenum chamber 18 of the exhaust gas manifold 14. The ports 28 open through the rear end wall 36 in the region between the adjacent ends of the sleeves 38, 40. An annular end wall 42 is secured to the rear ends of the sleeves 38, 40 to close the rear end of the chamber 18. The nozzle 22 is coaxially secured to the annular wall 42 and includes an inlet portion 44, a throat 46, and an exit cone 48.

During rocket engine operation, the exhaust gas stream flowing through the nozzle assembly 10 enters the swirl chamber 20 with a tangential velocity through the injection ports 30. The exhaust stream thus undergoes vortical or swirling flow through the swirl chamber and is thereby subjected to a centrifugal force which drives the gas outwardly toward the wall of the swirl chamber and nozzle and produces a central gas-free void along the axis of the nozzle assembly.

The tangential velocity component and the flow angle from the axial direction increase as the gas stream approaches the throat 46 of the nozzle 22. As the exhaust gas expands through the nozzle exit cone the flow angle is reduced to provide near axial flow due to the reduction in the tangential velocity component and the increase in the axial velocity component produced by the expansion.

The effective area of the annular flow path to which the exhaust gas stream is confined during its flow through the swirl chamber 20 to the nozzle throat 46 in any plane normal to the nozzle axis is equal to the difference between the total cross sectional area of the swirl chamber or nozzle passage, as the case may be, and the central void, measured in the normal plane modified by the cosine of the flow angle.

At this point, therefore, it is evident that the effective area ratio of the present rocket nozzle assembly 10 is the ratio of the effective exit area of the nozzle 22 to the minimum area of the effective annular flow area to which the exhaust gas stream is confined as it approaches the nozzle throat 46. This effective area ratio is substantially higher than the actual area ratio of the nozzle 22 and may be regulated by regulating the tangential velocity component of the exhaust gas stream within the swirl chamber 20. Thus, increasing the tangential velocity component of the exhaust stream reduces the effective area of the annular exhaust gas flow path and thereby reduces thrust and increases the effective area ratio. Reducing the tangential velocity component has the reverse effect. According to the present invention, the effective area ratio of the nozzle assembly is regulated, while maintaining high nozzle stagnation pressure and within the limits of the allowable thrust envelope, to effect expansion of the exhaust gas through the nozzle 22 to a pressure approximating or equalizing ambient pressure. Since the inner surface of the void core represents a free boundary bleeding of ambient air into this region, it can provide additional performance enhancement through the so-called altitude compensation effect.

For exo-atmospheric operation, higher performance will be obtained in the throttling mode due to increased effective area ratio and through maintaining high nozzle stagnation pressure. The overall rocket engine performance or efficiency (i.e. thrust coefficient) is thereby maximized.

The tangential velocity component of the exhaust gas stream flowing through the swirl chamber 20 to the nozzle 22 may be regulated in various ways to regulate the effective nozzle area ratio and hence the exhaust gas exit pressure and rocket engine efficiency. In the illustrated embodiment of the invention under discussion, for example, the tangential velocity component may be regulated by varying the size and/or tangential angle of the exhaust gas injection ports 30. Many other regulating means for this purpose, such as turning vanes or flow mixing ports, are possible.

In some cases, it may be preferable to replace the exhaust gas manifolding arrangement of the nozzle assembly under consideration by a gas generator or combustor 50 connected to swirl chamber 52, as shown in FIGURE 3. The working fluid is injected into the swirl chamber 52 through tangential ports 53 and axial ports 54. Varying the relative amount of flow through these sets of ports by use of a flow diverter 55 produces a mixed gas flow of variable net vorticity. Alternatively these combustors may be equipped with suitable means (not shown), such as throttling valves, for regulating the tangential velocity of the exhaust gas stream within the swirl chamber and hence the rocket engine performance.

What is claimed is:
1. A high performance rocket engine nozzle assembly comprising:
a nozzle casing defining a generally cylindrical swirl chamber and a nozzle coaxially disposed at one end of said chamber with its throat communicating axially with said chamber; and
combustion chamber means for supplying exhaust gas under pressure to said chamber in such manner as to induce vortical flow of said gas through and about the axis of said chamber to said nozzle throat with sufficient angular velocity to produce a centrifugally created gas-free void along said axis and confine the exhaust gas stream to an annular flow path having an effective area which diminishes to a minimum area adjacent said nozzle throat, thereby to increase the effective area ratio of said nozzle.

2. A nozzle assembly according to claim 1 wherein:
said combustion chamber exhaust gas supply means includes tangential exhaust gas injection ports in the wall of said swirl chamber.

3. A nozzle assembly according to claim 2 wherein:
said combustion chamber exhaust gas supply means further includes means furnished by said casing defining an exhaust gas manifold about said swirl chamber and communicating with said injection ports.

4. A high performance rocket engine nozzle assembly comprising:
a nozzle casing defining a generally cylindrical swirl chamber and a nozzle coaxially disposed at one end of said chamber with its throat communicating axially with said chamber, and
means for supplying exhaust gas under pressure to said chamber to induce vortical flow of said gas through and about the axis of said chamber to said nozzle throat with sufficient angular velocity to produce a centrifugally created gas-free void along said axis and confine the exhaust gas stream to an annular flow path having an effective area which diminishes to a minimum area adjacent said nozzle throat, said means including a plurality of combustion spaced about said swirl chamber for injecting exhaust gas under pressure directly and tangentially into said swirl chamber.

References Cited

UNITED STATES PATENTS

| 3,073,114 | 1/1963 | Wood | 60—39.14 |
| 3,158,997 | 12/1964 | Blackman | 60—258 |
| 3,307,357 | 3/1967 | Colgate | 60—203 |
| 3,330,116 | 7/1967 | Ellis | 60—258 |

CARLTON R. CROYLE, *Primary Examiner.*

DOUGLAS HART, *Assistant Examiner.*